March 24, 1970 L. A. VOS 3,503,056

AERODYNAMICALLY OPERATED SWITCH FOR CONTROLLING THE RAISING AND LOWERING OF MAGNETIC TRANSDUCERS IN A DYNAMIC RECORDING SYSTEM

Filed Nov. 25, 1966

INVENTOR
LEROY A. VOS
BY Charles R. Johnson
ATTORNEY

United States Patent Office 3,503,056
Patented Mar. 24, 1970

3,503,056

AERODYNAMICALLY OPERATED SWITCH FOR CONTROLLING THE RAISING AND LOWERING OF MAGNETIC TRANSDUCERS IN A DYNAMIC RECORDING SYSTEM

Leroy A. Vos, St. Paul, Minn., assignor to Sperry Rand Corporation, New York, N.Y., a corporation of Delaware Filed Nov. 25, 1966, Ser. No. 597,001
Int. Cl. G11b *5/00*
U.S. Cl. 340—174.1 1 Claim

ABSTRACT OF THE DISCLOSURE

The present disclosure relates to an aerodynamically operated electrical switch for controlling the raising and lowering of magnetic transducers with respect to an inductively coupled but relatively moving magnetizable recording surface.

The present invention relates to the magnetic recording art as used in electronic data processing equipment, and in particular to magnetic recording systems such as magnetic drum and disc storage media. The invention is directed toward a method of monitoring the velocity of the storage medium and generating control signals whenever the recording surface velocity passes below or above established levels. This invention in particular is directed toward those magnetic recording systems that incorporate "flying-heads" or magnetic transducers that are inductively coupled to a relatively moving magnetizable recording surface but are separated therefrom by the flow of air therebetween. As is well known in the art, such flying-heads are, by a suitable control mechanism, maintained in the proper inductive relationship with such moving recording surface only when the relative velocity of the flying-head and the recording surface is sufficient to maintain the proper spacing therebetween. If the relative velocity should drop below a minimum level the flying-head may "crash" into the recording surface destroying it and the data stored thereon. Thus, it is important that the control mechanism not lower the flying head toward the recording surface until the relative velocity therebetween has reached a safe minimum. Further, if such relative velocity should for any reason drop below the minimum safe level the control mechanism should raise the flying-heads away from the recording surface so as to prevent the flying-head crashing into the recording surface. As an example of some such flying-head systems, see the following patents, all assigned to the Sperry Rand Corporation as is the present application: A. K. Baillif, Patent No. 3,192,514; D. K. Sampson, Patent No. 3,193,810; R. W. Clarke et al., Patent No. 3,193,811; R. J. Eulberg, Patent No. 3,198,889; and A. K. Baillif, Patent No. 3,202,974.

The present invention in its preferred embodiment utilizes an electrical switch, such as a microswitch, that is mounted on the end plate or support member on a drum rotor cabinet. An air vane, one end of which is attached to the rotatable actuator of the electric switch, is mounted substantially parallel to the end plane of the drum rotor and in sufficiently close proximity thereto so as to permit the rotating drum rotor end plane to exert an aerodynamic force thereupon. The aerodynamic force exerts a torque upon the electric switch's rotatable actuator which torque may be adjusted by many factors, such as air vane design, physical relationship between the end plane and the air vane, an end plane impeller, etc. to effect the desired relationship between the drum rotor velocity and flying head lowering and raising control mechanism.

In general, the relationship of the air vane, residing between the end plane and the end plate, causes an air current to flow inthe area occupied by the air vane. This air current imparts a force upon the air vane that is proportional to the drum rotor velocity V, or $$F=k_1V$$

This force is seen as a torque T at the switch rotatable actuator, or $$T=k_2F=k_1k_2V$$

$$T=k_3V$$

where $k_1$, $k_2$, $k_3$ are constants of the particular arrangement utilized.

If the torque required to actuate the switch is defined as T*a* the corresponding force F*a* and the corresponding drum rotor velocity as V*a* it follows that the electric switch remains active for all drum rotor velocities in excess of V*a*. Furthermore, the retentive force F*t* that is required to maintain the switch active is less than the force F*a* that is required to initially activate the switch; the drum rotor speeds differ for raising and for lowering the flying-heads. As an example of the above, in the Univac FH432 Drum Unit having a nominal drum rotor velocity of 7150 r.p.m., using the present invention, the flying-heads were lowered at a drum rotor velocity of 7000 r.p.m. and were raised at a drum rotor velocity of 6000 r.p.m.

Prior art devices for detecting drum rotor velocity in magnetic drum systems incorporating flying-heads have included arrangements that monitor the drum rotor drive motor velocity; however, variations between drive motor velocity and drum motor velocity such as are due to broken or worn drive belts are not detected by this system. Other systems such as in Patents Nos. 3,172,962 and 3,180,943 that operate on the peripheral air currents along the drum rotor magnetizable surface are subject to many inherent errors due to the more complicated linkages and air current detection systems associated therewith. Additionally, the systems of the above-mentioned patents are particularly subject to variations in drum rotor peripheral air currents due to the positioning of the flying-heads thereon.

As is well known, the magnetic recording surfaces about the drum rotors form a plurality of adjacent data tracks. Groups of these data tracks are associated with a like number of read/write heads in a head block which head block constitutes one flying-head. With the close packing of such data tracks so as to utilize every possible data track along the magnetizable surface of the drum rotor a plurality of such flying-heads are associated with each drum rotor. Such plurality of flying-heads are staggered along the drum rotor periphery for maximum data compaction. These staggered flying-heads, when in their raised or lowered position, effect the air flow along the magnetizable surface of the drum rotor in varying degrees such that it has been applicant's experience that such variations in air flow do not permit sufficient operating tolerances of the air flow detecting system. However, by moving the air flow detector off the recording surface of the drum rotor and onto the end plane of the drum rotor the air current variations due to flying-head positions and movements have been substantially eliminated. Applicant's system therefore provides a more reliable drum rotor velocity detector providing closer operating tolerances against uncontrollable variations in drum rotor velocity, and, consequently precluding the possibility of flying-heads crashing into the magnetizable recording surface of the rotating drum rotor.

Accordingly, it is an object of the present invention to provide an aerodynamically operated switch for controlling the raising and lowering of magnetic transducers with respect to an inductively coupled but relatively moving recording surface.

It is a more general object of the present invention to provide a means of aerodynamically sensing variations in the velocity of a moving medium.

These and other more detailed and specific objectives will be disclosed in the following specification, reference being had to the accompanying drawings, in which.

Figures 1, 2:
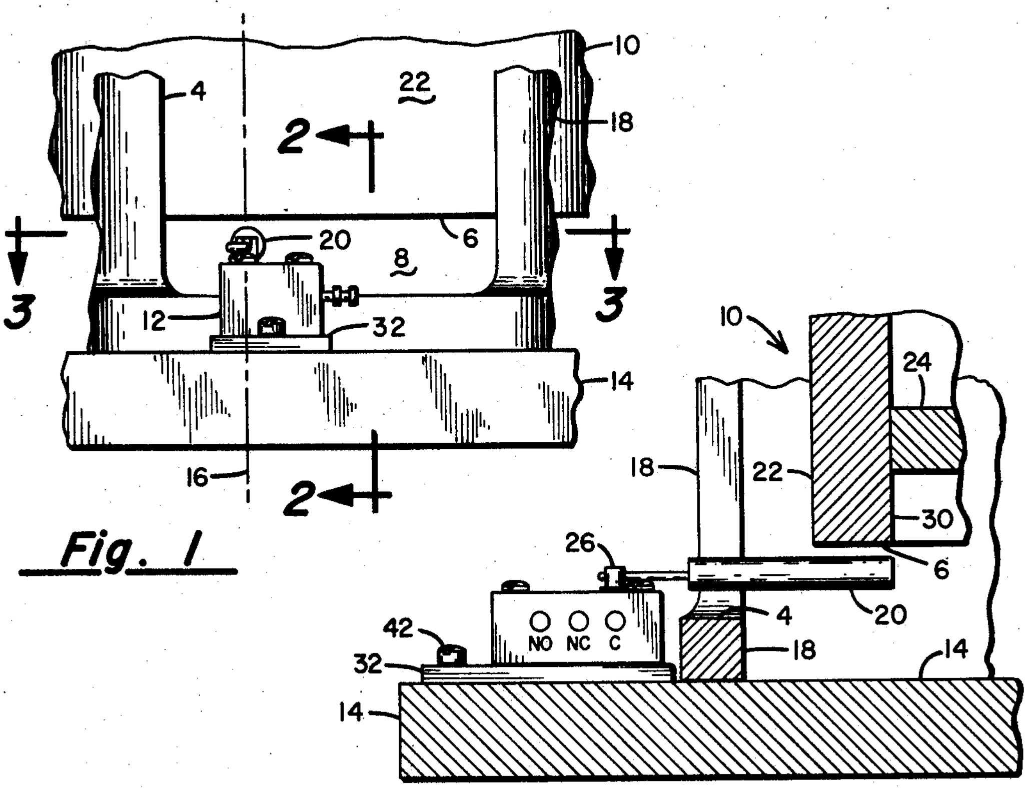
FIG. 1 is an illustration of a side view of a magnetic drum memory system incorporating the present invention.
FIG. 2 is a sectional view taken along line 2—2 on FIG. 1.

With particular reference to FIG. 1 there is presented an illustration of a side view, less protective cabinet and environmental stabilizing equipment, of a magnetic drum memory system incorporating the present invention. FIG. 1 illustrates that portion of the bottom end of drum rotor 10 that is in the area of electrical switch means 12. In the magnetic drum system of the illustrated embodiment of FIG. 1 drum rotor 10 is mounted in a vertical relationship upon end plate 14 with the vertical or longitudinal axis 16 of drum rotor 10 perpendicular to the plane of end plate 14. Upon end plate 14, and about drum rotor 10 is installed a cylindrical shroud means 18 for the protection of the various elements that are associated with drum rotor 10. In this embodiment drum rotor 10 is 10.5 inches in diameter and 9.0 inches in length with an access hole 4 in shroud 18 providing an opening of approximately 0.30 inch between it and the end plane 6 of drum rotor 10. Switch means 12 is mounted upon end plate 14 with air vane 20 vertically centered within the access hole 4—drum rotor 10 formed opening 8.

With particular reference to FIG. 2 there is presented a sectional view taken along line 2—2 of FIG. 1 in which the longitudinal and radial relationship of vane 20 with drum rotor 10 is more clearly illustrated. In the illustrated embodiment drum rotor 10 is composed of a cylindrical-like shell portion, or tire, 22 and a main body portion 24, wherein tire 22 is of approximately 0.75 inch thickness and extends longitudinally beyond body portion 24 approximately 0.75 inch. This extension of tire 22 provides the end surface or end plane 6 which, upon rotation of drum rotor 10, generates the air current that couples the aerodynamic forces to vane 20. Vane 20 is mounted on rotatable actuator 26 of switch 12 in a manner to be centrally located with the opening 8 formed by drum rotor 10 and access hole 4 having its end portion 28 substantially coterminal with surface 30 of tire 22. As shown in FIG. 1 switch 12 may be mounted upon any suitable mounting means, 32 for establishing vane 20 within the proper central location of opening 8.

Figure 3:
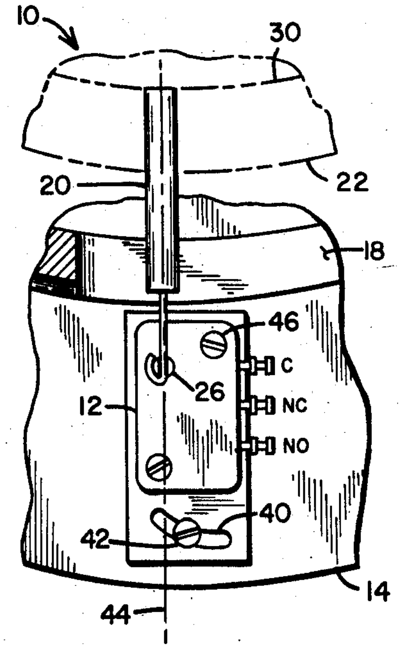
FIG. 3 is a sectional view taken along line 3—3 of FIG. 1.

With particular reference to FIG. 3 there is presented a sectional view taken along line 3—3 of FIG. 1 for particularly showing the radial relationship of vane 20 and tire 22 of drum rotor 10. This view shows the slotted aperture 40 in support 32 of switch 12 through which bolt 42 is inserted for securing switch 12 to end plate 14. Slotted aperture 40 permits the axial alignment of vane 20 along radial line 44 of drum rotor 10 by rotating about bolt 46. Slotted aperture 40 permits vane 20 to be oriented at any desired variation from the illustrated radial line 44. This ability to vary the orientation of vane 20 from radial line 44 may be utilized to compensate for differences in switch 12 characteristics such as actuating torque $T_a$.

Figure 4:
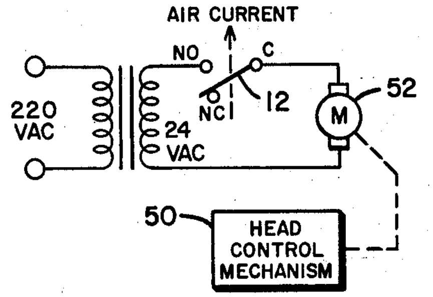
FIG. 4 is a schematic of a circuit associated with the switch of the present invention.

With particular reference to FIG. 4 there is presented a circuit schematic of the circuit permitting switch 12 to control the flying-head control mechanism 50 as utilized with the preferred embodiment of the present invention. Primary power is a 220 volt AC source providing a 24 volt AC drive for the motor 52 of the flying-head control mechanism 50 such as shown in the above mentioned A. K. Baillif patents. Operation is as discussed above. When the drum rotor 10 achieves sufficient velocity $V_a$ to activate switch 12 the common contact C is moved from the normally closed contact NC to the normally open contact NO whereupon the 24-VAC signal is coupled across motor 52 lowering the flying-heads toward the moving recording surface. When the velocity of drum rotor 10 falls below the retaining velocity $V_t$ the common contact C of switch 12 is permitted to move from the normally open contact NO to the normally closed contact NC whereupon the 24 v. AC signal is decoupled from motor 52 permitting the flying-head control mechanism 50 to raise the flying-heads away from the moving recording surface.

Thus, it is apparent that applicant has provided a novel method of controlling the raising and lowering of magnetic transducers in a dynamic magnetic memory system by providing an aerodynamically operated switch for detecting optimum operating drum rotor velocities. It is understood that suitable modifications may be made in the structure as disclosed provided such modifications come within the spirit and scope of the appended claims.

Having, now, therefore, fully illustrated and described my invention what I claim to be new and desire to protect by Letters Patent is set forth in the appended claim.

What is claimed is:

1. An aerodynamically operated mechanism for controlling the lowering and raising of a flying-head magnetic transducer in a dynamic magnetic memory system; comprising:

a surface capable of revolving about and perpendicular to a fixed longitudinal axis;

support means for fixedly supporting said surface;

an electric switch means mounted on said support means and having a rotatable actuator whose axis of rotation is substantially perpendicular to said surface;

an air vane fixedly attached to said rotatable actuator for rotating in a plane that is substantially parallel to and in an aerodynamically-cooperative, substantially radially-aligned relationship with said surface;

said revolving surface generating an associated air current that is aerodynamically coupled to said air vane for imparting a force upon said air vane that is substantially proportional to the rotational velocity of said surface;

said force imparting a substantially proportional torque upon said rotatable actuator for operating said switch means;

a control mechanism coupled to said switch means for controlling the lowering and raising of an associated flying-head transducer;

a first rotational velocity of said surface for imparting an initiating torque upon said rotational actuator for causing said switch means to generate a first signal for lowering said flying-head transducer toward said surface;

a second rotational velocity of said surface less than said first rotational velocity for imparting a releasing torque upon said rotational actuator for causing said switch means to generate a second signal for raising said flying-head transducer away from said surface;

a rotational velocity range between said first and second rotational velocities for imparting a retentive torque upon said rotational actuator for causing said switch means to maintain said first signal for maintaining said flying-head transducer in said lowered position.

References Cited

UNITED STATES PATENTS

| | | | |
|---|---|---|---|
| 3,056,003 | 9/1962 | Rabinow | 200—81.9 |
| 3,070,676 | 12/1962 | Moseres | 200—81.9 |
| 3,167,753 | 1/1965 | Fairburn | 200—81.9 |

| | | | |
|---|---|---|---|
| 3,172,962 | 3/1965 | Lammeren et al. | 340—174.1 |
| 3,180,943 | 4/1965 | Oort | 340—174.1 |
| 3,248,737 | 4/1966 | Thomas et al. | 340—174.1 |

BERNARD KONICK, Primary Examiner

V. P. CANNEY, Assistant Examiner

U.S. Cl. X.R.

200—81.9